(12) United States Patent
Shokrollahi et al.

(10) Patent No.: US 9,800,197 B2
(45) Date of Patent: Oct. 24, 2017

(54) METHOD AND DEVICE FOR IDENTIFYING AN ELECTRIC MACHINE

(71) Applicant: Robert Bosch GmbH, Stuttgart (DE)

(72) Inventors: Jamshid Shokrollahi, Ludwigsburg (DE); Hamit Hacioglu, Stuttgart (DE); Hanne Beck, Asperg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 104 days.

(21) Appl. No.: 14/198,799

(22) Filed: Mar. 6, 2014

(65) Prior Publication Data

US 2014/0253007 A1 Sep. 11, 2014

(30) Foreign Application Priority Data

Mar. 6, 2013 (DE) .................. 10 2013 203 811

(51) Int. Cl.
 *H02P 6/182* (2016.01)
 *H02P 31/00* (2006.01)
 *H02P 23/14* (2006.01)
 *H02K 15/00* (2006.01)

(52) U.S. Cl.
 CPC ............. *H02P 31/00* (2013.01); *H02K 15/00* (2013.01); *H02P 23/14* (2013.01)

(58) Field of Classification Search
 CPC ...................................................... H02P 23/14
 USPC ..................... 318/362, 400.3, 410.1, 767
 See application file for complete search history.

(56) References Cited

U.S. PATENT DOCUMENTS

| | | | | | |
|---|---|---|---|---|---|
| 4,379,258 | A | * | 4/1983 | Sugimoto | H02J 3/1892 318/729 |
| 5,744,897 | A | * | 4/1998 | Takagi | H02N 2/142 310/316.02 |
| 6,111,386 | A | * | 8/2000 | Schenk | B60L 15/08 318/139 |
| 2004/0090204 | A1 | * | 5/2004 | McGinley | B60K 25/00 318/767 |
| 2007/0216328 | A1 | * | 9/2007 | Iura et al. | 318/362 |
| 2008/0166246 | A1 | * | 7/2008 | Swanson | F04D 25/0606 417/410.1 |
| 2009/0261764 | A1 | * | 10/2009 | Hirata | H02P 6/008 318/400.29 |
| 2011/0006709 | A1 | * | 1/2011 | Naiman | H02P 27/04 318/400.3 |
| 2012/0019188 | A1 | * | 1/2012 | Fukutani | H02J 3/1892 318/729 |

(Continued)

FOREIGN PATENT DOCUMENTS

DE 102010038703 1/2012

*Primary Examiner* — Eduardo Colon Santana
*Assistant Examiner* — Cortez Cook
(74) *Attorney, Agent, or Firm* — Norton Rose Fulbright US LLP; Gerard Messina

(57) ABSTRACT

A method for generating a challenge-response pair in an electric machine as a basis for an identification or authentication is described, the electric machine having a stator and a rotor, a first alternating voltage between two points of a first defined point pair of the electric machine being applied as a challenge, which causes an induction in the electric machine, a variable dependent on the caused induction being determined as a response. The first alternating voltage has a frequency which is higher than the working frequency of the electric machine.

17 Claims, 1 Drawing Sheet

(56) References Cited

U.S. PATENT DOCUMENTS

| | | | |
|---|---|---|---|
| 2012/0030270 A1* | 2/2012 | Shokrollahi | H04L 9/3278 708/802 |
| 2013/0285588 A1* | 10/2013 | Ito | H02P 23/14 318/490 |
| 2014/0201851 A1* | 7/2014 | Guo | H04L 9/0866 726/34 |

* cited by examiner

METHOD AND DEVICE FOR IDENTIFYING AN ELECTRIC MACHINE

FIELD OF THE INVENTION

The present invention relates to a method and a device for generating a challenge-response pair in an electric machine for identifying this machine.

BACKGROUND INFORMATION

German Patent No. 10 2010 038 703 describes the uses of the electrical properties of a rotating electric machine for differentiating individual electric machines of a same production series from one another ("fingerprint"). It was proposed in this publication to use electrical properties, in particular the induction of electric machines, for their identification. This approach is based on the assumption that due, for example, to differences in the windings of the individual electric machines, which are also detectable in electric machines of a single production series, the corresponding inductions are different, it being possible to use these differences for differentiating the electric machines from one another. However, this method only functions (when relatively economical measuring systems are used) for devices satisfying only low to medium quality requirements and having tolerances of a similar magnitude. For production series which must satisfy higher tolerance requirements, the differences in the above-named parameters or electrical properties are very small, making it difficult or hardly possible to identify individual electric machines, in particular when relatively simple measuring devices are used. In any case, very complex and accordingly expensive measuring systems must be used for this purpose.

The present invention is intended to provide a simple identification or authentication method for rotating electric machines, which may also be used for production series having low tolerances.

SUMMARY

According to the present invention, a first voltage between the points of a first defined point pair of the electric machine which causes an induction in the electric machine is applied or generated as a challenge, a variable depending on the caused induction being determined as a response. The applied first voltage is in this case an alternating voltage having a frequency which is higher than the working frequency of the electric machine.

According to the present invention, the detection of a frequency response of the electric machine to be identified or authenticated is used as a physically unclonable function (PUF).

The implementation of the method in the form of software is also advantageous, since it entails very low costs, in particular when an executing arithmetic unit is also used for other tasks and is therefore present anyway. Suitable data media for providing the computer program are, in particular, diskettes, hard drives, flash memories, EEPROMs, CD-ROMs, DVDs, etc. A download of a program via computer networks (Internet, Intranet, etc.) is also possible.

It is preferred that the first voltage has a frequency which has at least 50 times, in particular at least 100 times, the working frequency of the electric machine.

The application of such frequencies to a defined point pair of the electric machine also makes it possible to make an effective differentiation from one another for production series having very low tolerances and individual machines of this production series.

It is particularly preferred that the first voltage has a frequency of at least 10 MHz, preferably at least 15 MHz. Such frequencies are usable in a favorable manner for electric machines which have, for example, frequencies in the range from 6 KHz through 10 KHz as typical working frequencies. In this case, the detection of a high-frequency response of the electric machine to be identified or authenticated is used as a physically unclonable function (PUF).

It is particularly preferred that the method according to the present invention is carried out for different frequencies, the frequencies being varied discretely or continuously, in particular across a predetermined frequency range. A frequency range from 10 MHz through 15 MHz proves to be particularly advantageous for many applications. When the method according to the present invention is, for example, carried out in uniform intervals across this frequency range, characteristic challenge-response curves are obtained for individual electric machines to be identified.

It is particularly preferred to determine a second voltage between points of a second defined point pair of the electric machine as a response. Such a high-frequency second voltage corresponding to the first voltage may be detected in a simple and precise manner.

It is preferred that the first voltage is applied to a first pair of terminals of a delta circuit of a stator, and the second voltage is detected on a second pair of terminals of the delta circuit of the stator which is different from the first pair. However, it is also possible to apply or detect the method according to the present invention on corresponding terminal pairs of a triangular circuit of a stator and/or of a rotor. It is in particular possible to provide the first pair of terminals on a stator and the second pair of terminals on a rotor, or vice versa.

According to a particularly advantageous specific embodiment of the method according to the present invention, the ratio of the first voltage to the second voltage is formed for a suitable number of frequencies across a predetermined frequency range, and is plotted against the particular frequency of the first voltage.

Additional advantages and embodiments of the present invention arise from the description and the accompanying drawings.

It is understood that the features stated above and the features still to be explained below are usable not only in the particular combination specified but also in other combinations or alone without departing from the scope of the present invention.

The present invention is depicted schematically in the drawings based on an exemplary embodiment and will be described in greater detail below with reference to the drawings.

DETAILED DESCRIPTION

Figure 1:
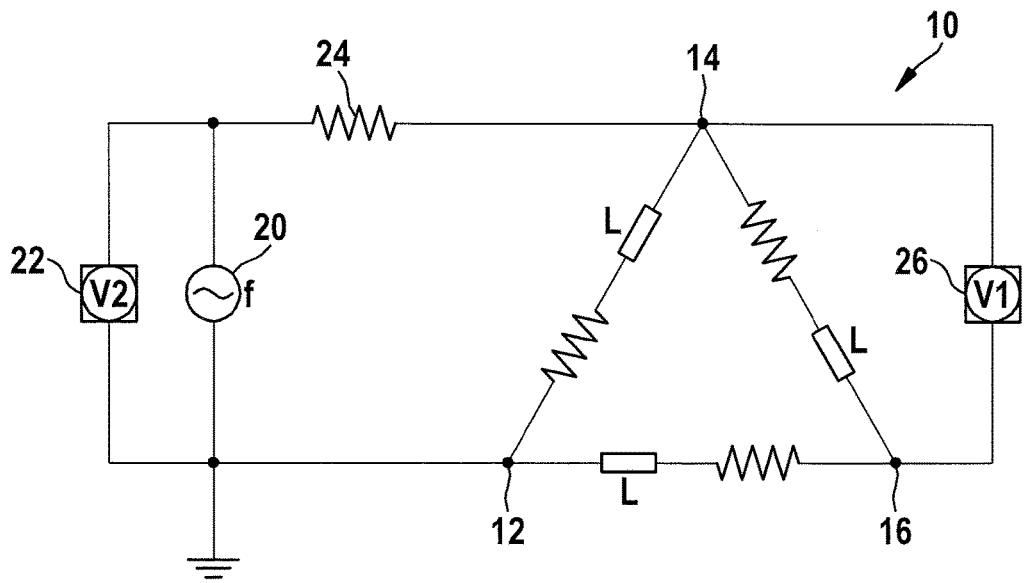
FIG. 1 shows an exemplary embodiment of a circuit of an electric machine of a preferred specific embodiment of a device according to the present invention for generating or determining a challenge-response pair.

A circuit formed as a triangular or delta circuit of the windings of the stator of an electric machine is denoted with reference numeral 10 in FIG. 1. The windings (not shown) are additionally connected to a three-phase diode bridge, which, however, is also not shown here for the sake of simplicity of the drawings. None of these diodes is switched on during the generation of a challenge-response pair to be carried out according to the present invention.

The conductors for supplying the windings are also not shown. An alternating voltage generator 20 is used for generating the challenge or the challenge signal. The voltage amplitude generated by this alternating voltage generator is measured using a voltage measuring device 22. The response or response function is measured using a voltage measuring device 26.

With the aid of alternating voltage generator 20, a voltage V2 is applied to a first pair 12, 14 of the terminals of delta circuit 10. This applied voltage V2 is measured with the aid of first voltage measuring device 22. Device 22 may also be provided in generator 20 or on another suitable location of the electric machine to be identified. In this case, voltage V2 is a high-frequency alternating voltage in the frequency range between 15 MHz and 25 MHz. Since a stator typically has a low impedance, a resistor 24 is provided for current limiting.

On a second terminal pair 14, 16 of delta circuit 10, a second voltage V1, which is caused or induced by first voltage V2 with the aid of voltage measuring device 26, is measured with the aid of a second voltage measuring device.

The ratio of the amplitudes of voltages V1 and V2 depends on the mutual and own inductance of the windings of the stator. These amplitudes are provided to an evaluation unit (not shown) as voltage signals for determining this ratio. The evaluation unit determines the ratio of the amplitudes of V2/V1 as a function of the applied high-frequency alternating voltage.

The circuit shown by way of example in FIG. 1 shows a delta three-phase circuit. The method according to the present invention may be used on any other circuits of electric machines, for example, star connections, or on circuits having more than three phases.

The present invention was explained by way of example with reference to FIG. 1 for the case that both the challenge and the response are determined on particular point pairs of a stator. It is also possible to select or provide both point pairs on a rotor of an electric machine.

It is also possible to provide a first point pair for a challenge on a stator and a second point pair for the response on a rotor, or vice versa.

According to the present invention, the ratio of amplitudes V2/V1 is detected across a suitable frequency range, preferably the already-mentioned frequency range of 15 MHz through 25 MHz, and plotted against the particular alternating voltage frequency of voltage V2.

Figure 2:
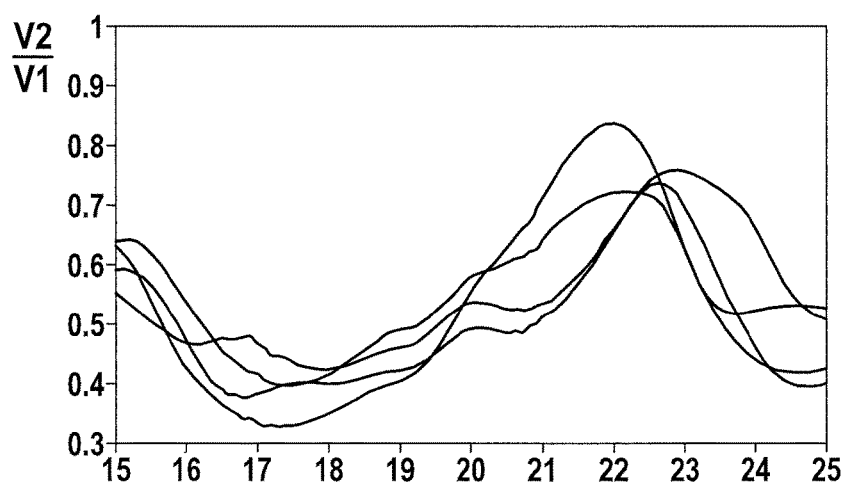
FIG. 2 shows a preferred exemplary embodiment of a response function usable according to the present invention.

In FIG. 2, this ratio V2/V1 is shown by way of example as a function of the frequency of V2 for four different electric machines of a same production series. It is apparent that for this frequency range, the individual electric machines may be differentiated from one another based on their V2/V1 ratios.

For the optimal design or preparation of the method according to the present invention, it is advantageous to select alternating voltage frequencies or frequency ranges, for which the electrical properties of the particular electric machines used as a response have the greatest differences. In the following, frequencies $f_1, f_2 \ldots$ through $f_n$ may be assumed to be particular frequencies of first alternating voltage V2, and $E_1, E_2 \ldots E_n$ as corresponding or particularly assigned electrical properties. In the preceding example, amplitude ratios V2/V1 thus represent these electrical properties.

In this case, for example, a method of the principal component analysis (PCA) type proves to be advantageously usable for locating the frequencies or frequency ranges in which the greatest differences in a group of different electric machines of a production series may be expected. These frequencies $f_1, f_2 \ldots, f_n$ or a subset of them represent in this case challenges for physically unclonable functions, and electrical properties $E_1, E_2 \ldots E_n$ represent the particular responses to be expected.

After suitable frequencies or frequency ranges are found, the function as represented in FIG. 2, for example, is ascertained for each individual electric machine of the production series. The corresponding functions may subsequently be used for the identification or authentication of the particular electric machines.

For a later identification, it is only necessary to apply the selected voltage frequencies as challenges to the particular electric machines, and the corresponding responses are measured.

In this connection, noise effects are compensated for. It should be noted that the amplitudes used for the later identification may correspond to those of the originally selected voltage signals; however, they are not required to do so.

Typical working frequencies of electric machines, for example, generators, lie in the range from 6 KHz through 10 KHz. The measuring frequencies or challenge frequencies of first voltage V2 used in the context of the present invention are typically at least a hundred times higher, i.e., at least approximately 0.5 MHz or 1 MHz. As explained above, measuring frequencies in the range of 15 MHz through 25 MHz are preferred in particular.

What is claimed is:

1. A method for generating a challenge-response pair in an electric machine as a basis for one of an identification or authentication of the electric machine, the electric machine having a stator and a rotor, the method comprising:

applying, by a voltage generation unit a first alternating voltage between two points of a first defined point pair of the electric machine, as a challenge, the applying causing an induction in the electric machine, wherein the first alternating voltage has a frequency which is higher than a working frequency of the electric machine;

determining, by a voltage measuring device, a second alternating voltage dependent on the caused induction as a response; and one of identifying or authenticating, by an evaluation unit, the electric machine based on a characteristic identifying feature of the electric machine derived from the first and second alternating voltages, wherein the characteristic identifying feature of the electric machine is formed by a ratio of amplitudes of the first alternating voltage and the second alternating voltage for a selected number of frequencies across a predetermined frequency range; and wherein the frequency of the first alternating voltage is at least 50 times the working frequency of the electric machine.

2. The method as recited in claim 1, wherein the frequency of the first alternating voltage is at least 100 times the working frequency of the electric machine.

3. The method as recited in claim 1, wherein the frequency of the first alternating voltage is at least 10 MHz.

4. The method as recited in claim 1, wherein the frequency of the first alternating voltage is at least 15 MHz.

5. The method as recited in claim 1, wherein the method is carried out for alternating voltages having different frequencies, the frequencies being varied discretely or continuously in particular across a predetermined frequency range.

6. The method as recited in claim 1, wherein the predetermined frequency range includes a frequency range of 10 MHz through 15 MHz.

7. The method as recited in claim 1, wherein the second alternating voltage is determined between two points of a second defined point pair of the electric machine.

8. The method as recited in claim 1, wherein:
the first alternating voltage is applied to a first pair of terminals of a delta circuit of a stator; and
the second alternating voltage is detected on a second pair of terminals of the delta circuit of the stator that is different from the first pair.

9. The method as recited in claim 1, wherein
the ratio of amplitudes is plotted against the particular frequency of the first alternating voltage.

10. The method as recited in claim 9, wherein the frequency range includes a frequency range of 10 MHz through 15 MHz.

11. A device for generating a challenge-response pair in an electric machine including a stator and a rotor as a basis for one of an identification or authentication of the electric machine, comprising:
a voltage generating unit for applying a first alternating voltage between two points of a first defined point pair of the electric machine, the applying causing an induction in the electric machine, wherein the first alternating voltage has a frequency which is higher than a working frequency of the electric machine; and
a voltage measurement unit for detecting a second alternating voltage dependent on the caused induction as a response;
wherein the electric machine is one of identified or authenticated, by an evaluation unit, based on a characteristic identifying feature of the electric machine derived from the first and second alternating voltages;
wherein the characteristic identifying feature of the electric machine is formed by a ratio of amplitudes of the first alternating voltage and the second alternating voltage for a selected number of frequencies across a predetermined frequency range; and
wherein the frequency of the first alternating voltage is at least 50 times the working frequency of the electric machine.

12. The device as recited in claim 11, wherein the frequency of the first alternating voltage is at least 50 times the working frequency of the electric machine.

13. The device as recited in claim 11, wherein the frequency of the first alternating voltage is at least 100 times the working frequency of the electric machine.

14. The device as recited in claim 11, wherein the frequency of the first alternating voltage is at least 10 MHz.

15. The device as recited in claim 11, wherein the frequency of the first alternating voltage is at least 15 MHz.

16. The device as recited in claim 11, wherein the second alternating voltage is determined between two points of a second defined point pair of the electric machine.

17. The device as recited in claim 16, wherein the characteristic identifying feature of the electric machine is formed by a ratio of amplitudes of the first alternating voltage and the second alternating voltage for a selected number of frequencies across a predetermined frequency range.

* * * * *